United States Patent
Sarangan et al.

(10) Patent No.: US 10,203,262 B2
(45) Date of Patent: Feb. 12, 2019

(54) LEAK LOCALIZATION IN WATER DISTRIBUTION NETWORKS

(71) Applicant: Tata Consultancy Services Limited, Mumbai (IN)

(72) Inventors: Venkatesh Sarangan, Chennai (IN); Iyswarya Narayanan, Chennai (IN); Arunchandar Vasan, Chennai (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 112 days.

(21) Appl. No.: 15/112,246

(22) PCT Filed: Feb. 17, 2015

(86) PCT No.: PCT/IB2015/000170
§ 371 (c)(1),
(2) Date: Jul. 18, 2016

(87) PCT Pub. No.: WO2015/124988
PCT Pub. Date: Aug. 27, 2015

(65) Prior Publication Data
US 2016/0349141 A1    Dec. 1, 2016

(30) Foreign Application Priority Data

Feb. 19, 2014 (IN) ............... 585/MUM/2014

(51) Int. Cl.
*E03B 1/02* (2006.01)
*G01M 3/28* (2006.01)
(Continued)

(52) U.S. Cl.
CPC ............ *G01M 3/2807* (2013.01); *E03B 1/02* (2013.01); *E03B 7/003* (2013.01); *G01F 1/00* (2013.01)

(58) Field of Classification Search
CPC ..... E03B 1/00; E03B 1/02; E03B 7/00; E03B 7/003; G01F 1/00; G01M 3/00; G01M 3/26; G01M 3/28; G01M 3/2807
See application file for complete search history.

(56) References Cited

U.S. PATENT DOCUMENTS

6,507,792 B1    1/2003   Senoo et al.
6,970,808 B2   11/2005   Abhulimen et al.
(Continued)

*Primary Examiner* — Nguyen Ha
(74) *Attorney, Agent, or Firm* — Finnegan, Henderson, Farabow, Garrett & Dunner LLP (57) ABSTRACT

Described herein, are methods and systems for locating a leak in a water distribution network. According to an implementation, a leak situation in the water distribution network is detected based on a flow difference value between an actual flow value and a predicted flow value of an inlet flow meter of the water distribution network at at least one time interval. Leak signature values of demand nodes in the water distribution network at the at least one time interval are determined. A leak signature value of a respective demand node at a respective time interval is determined based on centrality metrics, the predicted flow value at the respective time interval, and static physical properties related to the water distribution network. At least one possible leak node is identified based on the flow difference value and the leak signature values of the demand nodes at the at least one time interval.

13 Claims, 2 Drawing Sheets

(51) Int. Cl.
 *E03B 7/00* (2006.01)
 *G01F 1/00* (2006.01)

(56) References Cited

U.S. PATENT DOCUMENTS

| | | | |
|---|---|---|---|
| 7,330,796 B2* | 2/2008 | Addink | E03B 7/071 |
| | | | 702/45 |
| 7,920,983 B1 | 4/2011 | Peleg et al. | |
| 2004/0148113 A1 | 7/2004 | Sage | |
| 2011/0114202 A1 | 5/2011 | Goseco | |
| 2013/0179096 A1* | 7/2013 | Stevens | G01F 1/66 |
| | | | 702/48 |
| 2016/0061640 A1* | 3/2016 | Joshi | G01F 1/00 |
| | | | 73/197 |

* cited by examiner

LEAK LOCALIZATION IN WATER DISTRIBUTION NETWORKS

PRIORITY CLAIM

This U.S. patent application claims priority under 35 U.S.C. § 119 to: India Application No. 585/MUM/2014 filed on 19 Feb. 2014 and a PCT Application No. PCT/IB2015/000170 filed on 17 Feb. 2015. The entire contents of the aforementioned application are incorporated herein by reference.

TECHNICAL FIELD

The present subject matter relates to water distribution networks and, particularly but not exclusively, to locating a leak in water distribution networks.

BACKGROUND

Generally, water is distributed from reservoirs to points of consumption through one or more water distribution networks. Water distribution networks have hydraulic elements, such as water pipes and nodes. A node is a junction of two or more pipes. The water distribution networks are prone to leakages at the pipes and nodes, which may affect the water distribution to one or more points of consumption. The process of locating a leak or identifying a leak location in a water distribution network is referred to as "Leak Localization" in the water distribution network. The leak localization in a water distribution network allows an agency, referred to as a utility that maintains the water distribution network, to fix the leak so as to provide a sustained supply and a reliable distribution of water to consumers.

SUMMARY

Embodiments of the present disclosure present technological improvements as solutions to one or more of the above-mentioned technical problems recognized by the inventors in conventional systems.

In an aspect, there is provided a computer implemented method for locating a leak in a water distribution network, the method comprising: detecting, by a processor, a leak situation in the water distribution network based on a flow difference value between an actual flow value and a predicted flow value of an inlet flow meter of the water distribution network at at least one time interval being more than a predefined leak threshold; determining, by the processor, leak signature values of demand nodes in the water distribution network at the at least one time interval, wherein a leak signature value of a respective demand node at a respective time interval is indicative of a total flow increment due to the leak at the respective demand node and is determined based on centrality metrics, the predicted flow value at the respective time interval, and static physical properties related to the water distribution network; and identifying, by the processor (102), at least one possible leak node, from amongst the demand nodes, based on the flow difference value and the leak signature values of the demand nodes at the at least one time interval.

In another aspect, there is provided a system for locating a leak in a water distribution network, the system comprising: a processor; and a leak detection module coupled to, and executable by, the processor to: obtain an actual flow value and a predicted flow value of an inlet flow meter of the water distribution network at least one time interval; and compute a flow difference value between the actual flow value and the predicted flow value at the at least one time interval to detect a leak situation in the water distribution network based on the flow difference value being more than a predefined leak threshold; a leak signature computation module coupled to, and executable by, the processor to determine leak signature values of demand nodes in the water distribution network at the at least one time interval, wherein a leak signature value of a respective demand node at a respective time interval is indicative of a total flow increment due to the leak at the respective demand node and is determined based on centrality metrics, the predicted flow value at the respective time interval, and static physical properties related to the water distribution network; and a leak location module coupled to, and executable by, the processor to identify at least one possible leak node, from amongst the demand nodes, based on the flow difference value and the leak signature values of the demand nodes at the at least one time interval.

In yet another aspect, there is provided a computer program product, comprising a non-transitory computer readable medium having programmed instructions embodied therein to: detect a leak situation in the water distribution network based on a flow difference value between an actual flow value and a predicted flow value of an inlet flow meter of the water distribution network at at least one time interval being more than a predefined leak threshold; determine leak signature values of demand nodes in the water distribution network at the at least one time interval, wherein a leak signature value of a respective demand node at a respective time interval is indicative of a total flow increment due to a leak at the respective demand node and is based on centrality metrics, the predicted flow value at the respective time interval, and static physical properties related to the water distribution network; and identify at least one possible leak node, from amongst the demand nodes, based on the flow difference value and the leak signature values of the demand nodes at the at least one time interval.

It is to be understood that both the foregoing general description and the following detailed description are exemplary and explanatory only and are not restrictive of the invention, as claimed.

BRIEF DESCRIPTION OF DRAWINGS

The embodiments herein will be better understood from the following detailed description with references to the drawings, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in a computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
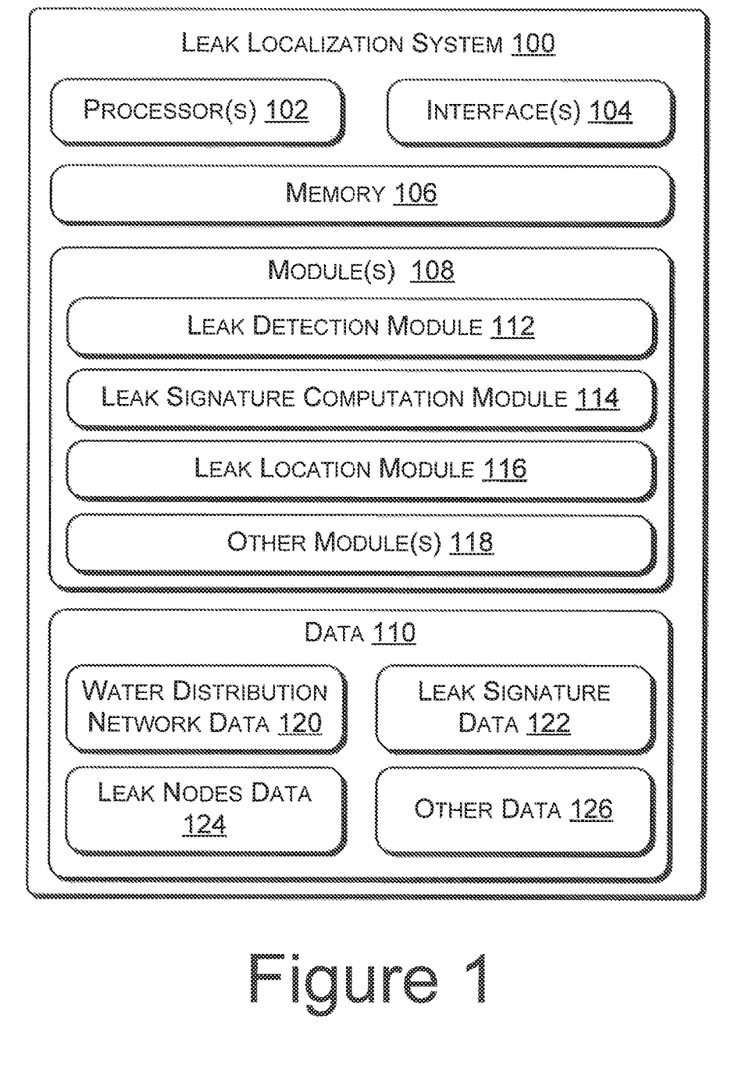
FIG. 1 illustrates a leak localization system, according to an implementation of the present subject matter.
Figure 2:
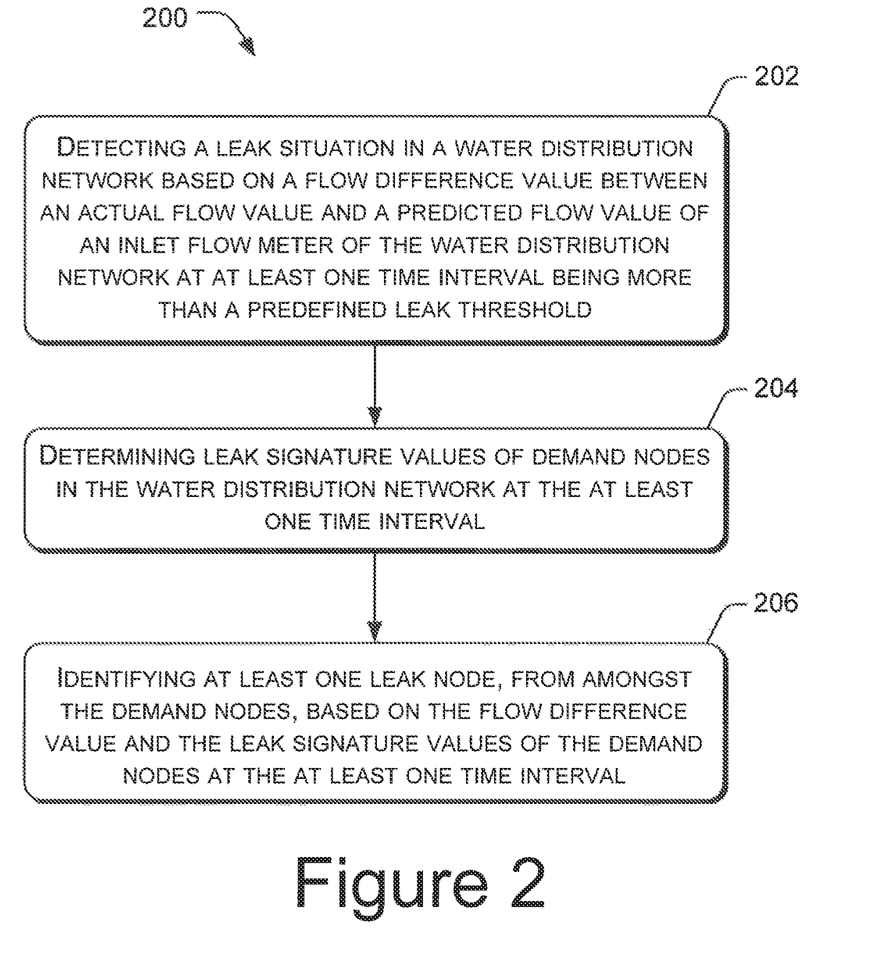
FIG. 2 illustrates a method for locating a leak in a water distribution network, according to an implementation of the present subject matter.

Referring now to the drawings, FIGS. 1 and 2, where similar reference characters denote corresponding features consistently throughout the figures, there are shown preferred embodiments and these embodiments are described in the context of the following exemplary system and method.

The present subject matter relates to methods and systems for locating leaks in water distribution networks. Locating a leak in a water distribution network may be understood as the process of identifying or locating a demand node at which a leak has occurred in the water distribution network. A node is a junction of two or more pipes in the water distribution network. A demand node is a node to which water is supplied from an inlet node of the water distribution network. Inlet node refers to a node at an inlet of the water distribution network. The water supplied depending on the demand at the demand node. Further, the demand node at which the leak has occurred is referred to as a leak node.

Conventionally, a leak node in a water distribution network is located using acoustic methods. In such methods, a field personnel walks along a pipeline network of the water distribution network with acoustic transmitters listening for variations in the reflected acoustic signals. The leak node is detected based on the variation in the reflected acoustic signals. Thus, locating the leak node through an acoustic method is manual, which makes such a method laborious, time consuming, and expensive.

Further, conventionally, a leak node in a water distribution network can be located using a hydraulic model simulation. For this, a hydraulic model is created that maps the physical water distribution network. The hydraulic model is also calibrated so as to replicate the actual operations of the physical water distribution network. To locate the leak node, the hydraulic model simulation is run with different choices of leak nodes. The node for which the results of simulation match with the inlet and outlet flow meter data is identified as the leak node. Most utilities do not have a hydraulic model. Moreover, the creation and calibration of a hydraulic model is costly, which makes the location of the leak node through a hydraulic mode simulation expensive.

Further, conventionally, a leak node in a water distribution network can be located based on machine learning techniques. Such techniques use data of multiple flow meters placed at various locations within the water distribution network. However, flow meters at multiple locations are generally not available within the water distribution network. Rather, a single flow meter is placed at the inlet of the water distribution network. Thus, to locate the leak node through a machine learning technique, several flow meters have to be placed at different locations. Placing the flow meters at different location is laborious and acquiring the flow meters increases the infrastructure cost substantially.

The present subject matter describes methods and systems for locating a leak in a water distribution network. With the methods and the systems of the present subject matter, a leak in the water distribution network can be located based on water flow data or values of a single flow meter installed at the inlet of the water distribution network. The flow meter at the inlet of the water distribution network is hereinafter referred to as inlet flow meter. The leak can be located automatically, without utilizing a hydraulic model or multiple flow meters at different locations. With the methods and the systems of the present subject matter, the leak in the water distribution network can be located cost effectively, with a budget smaller than that for analysis through hydraulic model simulations or through machine learning techniques based on data from multiple flow meters. Also, the manual efforts for locating the leak are substantially reduced.

In accordance with the present subject matter, the leak may be a major leak in the water distribution network. The major leak may be understood as a burst at a demand node due to a breakage or cracking of a pipe connected to that demand node. Although, in the water distribution network, demand nodes at multiple locations may be prone to major leaks, usually the weakest demand node gives away first. Thus, at a time, a major leak typically occurs at a single demand node at a single location. Multiple major leaks generally do not occur at the same time in a water distribution network.

In an implementation, a leak situation in the water distribution network may be detected initially. The leak situation is indicative of the leak occurring at one of the demand nodes in the water distribution network. After detecting the leak situation, one or more possible leak nodes may be identified. In the context of the present subject matter, a possible leak node is a demand node at which the major leak is possible to occur. With this, those demand nodes, from all the demand nodes in the water distribution network, can be short-listed where the major leak would have possibly occurred. Based on the identification of one or more possible leak nodes, the location of the respective possible leak node can be visited to determine an actual node of the major leak.

In an implementation, historic flow values of the inlet flow meter are obtained for when the water distribution network is leak-free. The water distribution network may be understood to be leak-free when there is substantially no leak or no major leak in the water distribution network. Based on the historic flow values, a predicted flow value of the inlet flow meter at one or more time intervals is obtained. The predicted flow value at a time interval is a water flow value of the inlet flow meter that is predicted at the time interval, when there was no major leak in the water distribution network. Further, an actual flow value of the inlet flow meter at the one or more time intervals is obtained. The actual flow value at a time interval is a real-time water flow value of the inlet flow meter at the time interval. A difference between the actual flow value and the predicted flow value at least at one time interval is computed, to detect a leak situation in the water distribution network. It may be noted that in the leak situation the actual flow value is more than the predicted flow value, where the difference is contributed due to the leak. Thus, if the difference, referred to as a flow difference value, is more than a predefined leak threshold the leak situation is detected in the water distribution network.

Further, leak signature values of the demand nodes in the water distribution network are determined. The leak signature values of the demand nodes are determined for the one or more time intervals at which the predicted flow value and the actual flow value of the inlet flow meter are obtained. A leak signature value of a demand node and at a time interval is indicative of a total flow increment due to a burst or a leak at that demand node at that time interval. The leak signature value of a demand node at a time interval is determined based on centralitymetrics, the predicted flow value of the inlet flow meter at that time interval, and static physical properties related to the water distribution network. In an example, the static physical properties may include lengths and diameters of pipes in the water distribution network.

In an example implementation, the leak signature value of each of the demand nodes at a respective time interval is determined by computing the total flow increment for which a pressure head at the respective demand node, due to a water flow from an inlet node, is within a first predefined tolerance limit of a predefined burst pressure head due to the leak at the respective demand node. For this, the pressure head at the respective demand node and at the respective time interval is determined based on current-flow centrality metrics for pipes in the water distribution network that are in a water path from an inlet node to that demand node. The current-flow centrality metrics are augmented with the static physical properties related to the water distribution network and are computed based on a water supply at each of the demand nodes equal to the predicted flow value at the respective time interval divided by a number of demand nodes in the water distribution network.

To determine the leak signature values of the respective demand node, the water supply for the respective demand node is iteratively increased by a predefined flow increment value, and the pressure head at the respective demand node is iteratively determined based on the current-flow centrality metrics computed for the incremented water supply, till the pressure head is about the predefined burst pressure head at the respective demand node. The integer multiple of the predefined flow increment value, based on the number of iterations, is determined to be the leak signature values of the respective node at the respective time interval.

It may be noted that the flow difference value of the inlet flow meter at a time interval is contributed by and is equivalent to the total flow increment due to the leak at one of the demand nodes. Thus, in an implementation, the computed flow difference value is compared with the leak signature values of all the demand nodes, and the demand nodes for which the respective leak signature values are within a second predefined tolerance value of the flow difference value are identified as the possible leak nodes. In an example, one or more demand nodes may be identified as the possible leak nodes.

The methodology of locating the leak, i.e., identifying the possible leak nodes in the water distribution network, in accordance with the present subject matter, is substantially simple. As the analysis to identify one or more possible leak nodes is based on the centrality metrics and easily available static physical properties of the water distribution network, the methodology of present subject matter is cost effective in comparison to the conventional methodology that uses hydraulic model simulations.

These and other advantages of the present subject matter would be described in greater detail in conjunction with the following figures. It should be noted that the description and figures merely illustrate the principles of the present subject matter.

FIG. 1 illustrates a leak localization system 100, according to an implementation of the present subject matter. The leak localization system 100, hereinafter referred to as the system 100, is configured to locate a leak in a water distribution network. The system 100 may be implemented in a computing device, such as a desktop computer, a laptop, a tablet, a personal digital assistant, a server, and the like.

In an implementation, the system 100 includes processor(s) 102. The processor(s) 102 may be implemented as microprocessors, microcomputers, microcontrollers, digital signal processors, central processing units, state machines, logic circuitries, and/or any devices that manipulate signals based on operational instructions. Among other capabilities, the processor(s) 102 fetch and execute computer-readable instructions stored in a memory. The functions of the various elements shown in FIG. 1, including any functional blocks labeled as "processor(s)", may be provided through the use of dedicated hardware as well as hardware capable of executing non-transitory machine readable instructions. Moreover, the term processor may implicitly include, without limitation, digital signal processor (DSP) hardware, network processor, application specific integrated circuit (ASIC), field programmable gate array (FPGA), read only memory (ROM) for storing non-transitory machine readable instructions, random access memory (RAM), non-volatile storage. Other hardware, conventional and/or custom, may also be included.

The system 100 also includes interface(s) 104. The interface(s) 104 may include a variety of machine readable instruction-based and hardware-based interfaces that allow the system 100 to interact with other devices, including web servers, data sources and external repositories, for the purpose of locating a leak in a water distribution network. Further, the interface(s) 104 may enable the system 100 to communicate with other communication devices, such as network entities, over a communication network.

Further, the system 100 includes memory 106, coupled to the processor(s) 102. The memory 106 may include any computer-readable medium including, for example, volatile memory (e.g., RAM), and/or non-volatile memory (e.g., EPROM, flash memory, etc.).

Further, the system 100 includes module(s) 108 and data 110. The modules 108 may be coupled to the processor(s) 102. The module(s) 108, amongst other things, include routines, programs, objects, components, data structures, and the like, which perform particular tasks or implement particular abstract data types. The module(s) 108 further include modules that supplement applications on the system 100, for example, modules of an operating system. The data 110 serves, amongst other things, as a repository for storing data that may be fetched, processed, received, or generated by the module(s) 108. Although the data 110 is shown internal to the system 100, it may be understood that the data 110 can reside in an external repository (not shown in the figure), which may be coupled to the system 100. The system 100 may communicate with the external repository through the interface(s) 104 to obtain information from the data 110.

In an implementation, the module(s) 108 of the system 100 includes a leak detection module 112, a leak signature computation module 114, a leak location module 116, and other module(s) 118. In an implementation, the data 110 of the system 100 includes water distribution network data 120, leak signature data 122, leak nodes data 124, and other data 126. The other module(s) 118 may include programs or coded instructions that supplement applications and functions, for example, programs in the operating system of the system 100, and the other data 126 comprise data corresponding to other module(s) 118.

The following description describes the locating of a leak in a water distribution network through the system 100, in accordance with an example implementation of the present subject matter, and it will be understood that the concepts thereto may be extended to locate leaks in multiple water distribution networks in a similar manner. For the purpose of description herein, the water distribution network includes an inlet node $n_{in}$ and m number of demand nodes $n_1$, $n_2$, ... $n_m$ connected through pipes p in the form of a network topology. The inlet node $n_{in}$ may be understood as the source node at the inlet of the water distribution network, and the demand nodes $n_i$'s may be understood as the sink nodes. The water distribution network also includes an inlet flow meter installed at the inlet of the water distribution network.

In an example implementation, for the purpose of locating a leak in the water distribution network, the leak detection module 112 obtains historic flow value of the inlet flow meter. The historic flow value may be obtained for predefined time period, for example, for last 3 months, during which the water distribution network is leak-free. Based on the historic flow value, the leak detection module 112 may generate a water flow model through which future flow values of the inlet flow meter at any time instance can be predicted. The historic flow values may be stored in the water distribution network data 120.

Based on the water flow model, the leak detection module 112 obtains predicted flow values of the inlet flow meter at one or more time intervals. The time intervals can be period or non-periodic time intervals, and can be selected by a user operating the system 100. To locate the leak, the leak detection module 112 obtains actual flow value of the inlet flow meter at the same time intervals. Let the time intervals be denoted by $t_0$, $t_1$, $t_2$, $t_3$, and so on. Let the predicted flow values and the actual flow value at the respective time intervals be denoted by $Fp_0$, $Fp_1$, $Fp_2$, $Fp_3$, ..., and $Fa_0$, $Fa_1$, $Fa_2$, $Fa_3$, ..., respectively. For the ease of understanding, the predicted flow values and the actual flow values at the respective time intervals are illustrated in Table 1.

TABLE 1

| Time interval | $t_0$ | $t_1$ | $t_2$ | $t_3$ | . . . . . . |
|---|---|---|---|---|---|
| Predicted flow value | $Fp_0$ | $Fp_1$ | $Fp_2$ | $Fp_3$ | . . . . . . |
| Actual flow value | $Fa_0$ | $Fa_1$ | $Fa_2$ | $Fa_3$ | . . . . . . |
| Flow difference value | $q_0$ | $q_1$ | $q_2$ | $q_3$ | . . . . . . |

Based on the obtained values, the leak detection module 112 computes a flow difference value between the actual flow value $Fa_i$ and the predicted flow value $Fp_i$ at each time intervals $t_i$. Let the flow difference value at the time intervals $t_0$, $t_1$, $t_2$, ... be denoted by $q_0$, $q_1$, $q_2$, and so on, as illustrated in Table 1. Then, the leak detection module 112 compares the flow difference value $q_i$ at the respective time interval $t_i$ with a predefined leak threshold $F_{th}$, and if the flow difference value $q_i$ at the time interval $t_i$ is more than the predefined leak threshold $F_{th}$, then the leak detection module 112 detects a leak situation in the water distribution network. In an example implementation, if the flow difference values $q_i$, $q_{i+1}$, ..., at two or more consecutive time intervals $t_i$, $t_{i+1}$, ..., is more than the predefined leak threshold $F_{th}$, then the leak detection module 112 detects the leak situation in the water distribution network. It may be noted that if the flow difference value $q_i$ at a time interval $t_i$ is more than the predefined leak threshold $F_{th}$, then the flow difference values $q_{i+1}$, $q_{i+2}$, ... at subsequent time intervals $t_{i+1}$, $t_{i+2}$, ... are also more than the predefined leak threshold, because of the leak in the water distribution network. Let's say the flow difference values $q_1$, $q_2$, $q_3$, ..., at the time intervals $t_1$, $t_2$, $t_3$, ..., are more than the predefined leak threshold $F_{th}$. The value of the predefined leak threshold $F_{th}$ may be stored in the water distribution network data 120.

Based on the detection of the leak situation, the leak signature computation module 114 determines leak signature values of the demand nodes $n_1$ to $n_m$ and at the time intervals $t_1$, $t_2$, $t_3$, and so on. The leak signature value of a demand node $n_i$ (i=1, 2, ..., m) and at a time interval $t_j$ (j=1, 2, 3, ...) is determined using centrality metrics, the predicted flow value $Fp_j$ at the time interval $t_j$, and static physical properties of the pipes p of the water distribution network, assuming that the demand node $n_i$ has a leak or burst. The leak signature value of the demand node $n_i$ is indicative of a total flow increment in the water distribution network assuming the leak at the demand node $n_i$. The leak signature value of the demand node $n_i$ is determined by iteratively incrementing a water supply or a demand at the demand node $n_i$ by a predefined flow increment value $\Delta$, and determining the pressure head at the demand node $n_i$ for each increment in the water supply, until the pressure head is equal to a predefined burst pressure head due to the leak at the demand node $n_i$. In an example, the predefined flow increment value $\Delta$ can be 10% of the normal demand at the demand node $n_i$. The procedure of determining the leak signature values of the demand nodes at the time intervals is described later in the description. The leak signature values are stored in the leak signature data 122.

TABLE 2

| | | Time interval | | | | |
|---|---|---|---|---|---|---|
| | | $t_1$ | $t_2$ | $t_3$ | . . . | . . . |
| Demand node | $n_1$ | $Q_{11}$ | $Q_{12}$ | $Q_{13}$ | . . . | . . . |
| | $n_2$ | $Q_{21}$ | $Q_{22}$ | $Q_{23}$ | . . . | . . . |
| | $n_3$ | $Q_{31}$ | $Q_{32}$ | $Q_{33}$ | . . . | . . . |
| | . . . | . . . | . . . | . . . | . . . | . . . |
| | $n_m$ | $Q_{m1}$ | $Q_{m2}$ | $Q_{m3}$ | . . . | . . . |

Let the leak signature value of a demand node $n_i$ (i=1, 2, ..., m) and at a time interval $t_j$ (j=1, 2, 3, ...) be denoted by $Q_{ij}$. For the ease of understanding, the leak signature values $Q_{ij}$'s for the demand nodes $n_i$'s and at the time intervals $t_j$'s are illustrated in Table 2.

Now, to locate the leak, the leak location module 116 identified one or more possible leak nodes, from amongst the demand nodes $n_1$, $n_2$, ..., $n_m$, based on the flow difference values $q_j$'s (j=1, 2, 3, ...) and the leak signature values $Q_{ij}$'s (i=1, 2, ..., m; j=1, 2, 3, ...) at the time intervals $t_j$'s (j=1, 2, 3, ...). For this, in an example, implementation, the leak location module 116 compares the flow difference value $q_1$ at the time interval $t_1$ with the leak signature values $Q_{i1}$'s for all the demand nodes $n_i$'s. The demand nodes $n_i$'s for which the flow difference value $q_1$ is within a second predefined tolerance limit of the respective leak signature values $Q_{i1}$'s are identified as a first set of nodes $S_1$. In an example, the second predefined tolerance limit may be about 5%. The leak location module 116 may then compare the flow difference value $q_2$ at the time interval $t_2$ with the leak signature values $Q_{i2}$'s for all the demand nodes $n_i$'s. The demand nodes $n_i$'s for which the flow difference value $q_2$ is within the second predefined tolerance limit of the respective leak signature values $Q_{i2}$'s are identified as a first set of nodes $S_2$. The leak location module 116 may then compare the difference value $q_3$ at the time interval $t_3$ with the leak signature values $Q_{i3}$'s for all the demand nodes $n_i$'s. The demand nodes $n_i$'s for which the flow difference value $q_3$ is within the second predefined tolerance limit of the respective leak signature values $Q_{i3}$'s are identified as a first set of nodes $S_3$. The leak location module 116 may repeat this process of comparison for up to the last time interval to identify demand nodes in fourth set of nodes $S_4$, fifth set of nodes $S_5$, and so on. The number of sets of nodes may depend on the number of time intervals at which the flow difference values q's are computed and are more than the predefined leak threshold $F_{th}$. In an example implementation, the number of time intervals may be at least two. The value of the second predefined tolerance limit may be stored in the leak nodes data 124.

To identify one or more possible leak nodes, the leak location module 116 identifies those demand nodes that occur maximum number of times across all the sets of nodes $S_1$, $S_2$, $S_3$, and so on, depending on the number of sets of nodes. The demand nodes which are present the maximum number of times across the sets of nodes are identified as the possible leak nodes by the leak location module 116. The information or the data of the identified possible leak nodes are stored in the leak nodes data 124. In an example, said information may include an identification tag associated with the possible leak nodes.

The number of possible leak nodes is substantially less than the total number of demand nodes in the water distribution network. In an example implementation, one or more demand nodes may be identified as the possible leak nodes. The locations of the possible leak nodes may be visited by a field personnel and an actual leak node, from amongst the possible leak nodes, can be located. The actual leak node is the demand node or the location where the leak has actually occurred.

The description now describes the procedure of determining the leak signature value $Q_{11}$ of the demand node $n_1$ at the time interval $t_1$. The procedure described herein can be repeated to determine the leak signature values $Q_{ij}$'s for all the demand nodes $n_i$'s and at all the time intervals $t_j$'s.

Consider a case where the water distribution network has E number of pipes and V number of nodes. The water distribution network is represented as a network topology illustrating the linkages of the pipes and the nodes. For the purposes of description herein, the pipes are denoted as ($p_1$, $p_2$, . . . , $p_E$) and the nodes are denoted as ($n_1$, $n_2$, . . . , $n_V$). The V nodes may include one inlet node $n_{in}$ and m number of demand nodes from $n_1$ to $n_m$. Thus, V may be equal to m+1.

For determining the leak signature value $Q_{11}$, current-flow centrality metrics for all the pipes in the water distribution network may be computed initially. The current-flow centrality metric for a pipe quantifies the amount of water that would pass through that pipe. Let the current-flow centrality metric for $i^{th}$ pipe $p_i$ be denoted by $M_F(p_i)$.

For computing the current-flow centrality metric $M_F(p_i)$ for the $i^{th}$ pipe, all those pairs of the inlet node $n_{in}$ and a demand node are identified for which the pipe $p_i$ lies in any path connecting the pair. For each identified pair of the inlet node $n_{in}$ and $t^{th}$ demand node ($n_{in}$, $n_t$), a fraction of water-flow from the inlet node $n_{in}$ to the demand node $n_t$ and passing through the pipe $p_i$ is determined. Let this fraction of water-flow be denoted by $I_{pi}(n_{in}, n_t)$.

In an implementation, the fraction of water-flow $I_{pi}$ through the pipe $p_i$ for all the identified pairs of inlet node $n_{in}$ and the demand node is computed based on an adjacency matrix for a network topology of the water distribution network. The adjacency matrix of the water distribution network captures the connectivity information between the nodes and represents which nodes are adjacent to other nodes. The adjacency matrix for the network topology having multiple nodes is a two dimensional square matrix of the order equal to the number of nodes. Each element of the adjacency matrix corresponds to a pair of nodes and is indicative of connectivity information from one node to the other for that pair. In an implementation, the adjacency matrix is generated based on static physical properties related to the water distribution network. The static physical properties may include length of the pipe and diameter of the pipe. The data related to static physical properties of the water distribution network is stored in the water distribution network data 120.

Let the adjacency matrix be denoted as [A], and the element with the connectivity information from $i^{th}$ node $n_i$ to the $j^{th}$ node $n_j$ is denoted as $A_{i,j}$. In an example implementation, the adjacency matrix [A] is generated with elements $A_{i,j}$s of the adjacency matrix [A] taking the values based on equation (1) below:

$A_{i,j}=D^5/L$: for a pair of $i^{th}$ and $j^{th}$ nodes($n_i$, $n_j$)

directly connected to each other; and $$A_{i,j}=0: \text{ for a pair of } i^{th} \text{ and } j^{th} \text{ nodes}(n_i, n_j) \quad (1)$$

not directly connected to each other, where D is the diameter and L is the length of the pipe connecting the nodes ($n_i$, $n_j$), and i and j take values from 1 to V (number of nodes). A pair of nodes ($n_i$, $n_j$) is considered to be directly connected if the nodes are connected through a single pipe without any other node in between. A single pipe may be understood as one physical pipe or one pipe equivalent to multiple parallel physical pipes between the pair of nodes. If a pair of nodes ($n_i$, $n_j$) is connected through multiple parallel physical pipes, without any other node in between, the single pipe is an imaginary pipe that offers a resistance equivalent to that offered by the multiple pipes. A pair of nodes ($n_i$, $n_j$) is considered to be not directly connected if the nodes are not connected through a single pipe.

The value of $D^5/L$ for a pipe is indicative of hydraulic admittance of the pipe. By incorporating hydraulic admittance of pipes in the adjacency matrix [A], connectivity information between the adjacent nodes, with respect to allowance of water to flow through the pipes, is captured in adjacency matrix [A]. This facilitates in computing the fraction of water-flow $I_{pi}$ for all the identified pairs of nodes for the pipe $p_i$ and thereby computing the current-flow centrality metric $M_F(p_i)$ for the pipe $p_i$.

After generating the adjacency matrix [A], a Laplacian matrix, denoted as [L], of the adjacency matrix [A] is computed. The elements $L_{i,j}$s of the Laplacian matrix [L] take the values based on equation (2) below:

$L_{i,j}=\Sigma A_{i,j}$: for i=j; and $$L_{i,j}=-A_{i,j}: \text{ for } i \neq j, \quad (2)$$

where the summation is over j=1 to V (number of nodes) except j=i; and i and j take values from 1 to V (number of nodes).

For computing the fraction of water-flow in the pipe $p_i$ from the inlet node $n_{in}$ to the $t^{th}$ demand node $n_t$, a proxy water-supply vector, denoted as [b], is generated over all the nodes n of the water distribution network. The elements b of the proxy water-supply vector [b] take the values based on equation (3) below:

$b(n_v)=Fp_1$: if v=in (inlet node);

$b(n)=-Fp_1/m$: if v=t:t belongs to the m demand nodes; and $\quad (3)$ $b(n_v)=0$: v≠in and v≠t, where v=1 to V (number of nodes). Now, considering that the total water-flow entering a node is equal to the total water-flow leaving the node, and the total potential of water across a closed loop in the water distribution network is zero, a proxy water-potential vector, denoted as [D], over all the nodes is computed based on equation (4) below:

$$[D]=[L]^{-1}[b]. \qquad (4)$$

Considering that the proxy water-supply vector [b] has only two non-zero values, i.e., the values for the nodes $n_{in}$ and $n_t$, the proxy water-potential vector [D] computed through equations (2) and (3) is indicative of water-potentials for the pair of nodes $n_{in}$ and $n_t$.

After computing the proxy water-potential vector [D], a water-flow vector, denoted as [I], for all the pipes p is computed based on equation (5) below:

$$[I]=[B][D]. \qquad (5)$$

Here [B] is a matrix computed based on adjacency matrix [A]. The element $B_{k,j}$ of the matrix [B] is indicative of the admittance of $k^{th}$ pipe $p_k$ with respect to the $j^{th}$ node $n_j$. Considering that the pipe $p_k$ is between a node $n_u$ at a higher water-potential and a node $n_v$ at a lower water-potential, the elements $B_{k,j}$ take values based on equation (6) below:

$B_{k,j}=A_{u,v}$: if j=u;

$B_{k,j}=A_{u,v}$: if j=v; and $B_{k,j}=0$: if j≠u and j≠v, $\qquad (6)$ where k=1 to E (number of pipes) and j=1 to V (number of nodes).

After computing the water-flow vector [I], a respective element $A_{i,j}$ of the adjacency matrix [A] is multiplied by (Old $I_{ij}$/New $I_{ij}$) to obtain an updated adjacency matrix [A']. For obtaining the updated adjacency matrix [A'] the value of Old $I_{ij}$ is 1, and the value of New is the value of the corresponding element $I_{ij}$ of the water-flow vector [I]. Based on the updated adjacency matrix [A'], an updated water-flow vector [I'] is computed in a manner described above. If the values of the elements of the updated water-flow vector [I'] are same or within a predefined limit of the corresponding values of the elements of the water-flow vector [I], the updated water-flow vector [I'] is considered as the final water-flow vector [$I_F$] for determining the fraction of water-flow $I_{pi}(n_{in}, n_t)$ for the inlet node $n_{in}$ and the demand node $n_t$. If not, then a respective element $A'_{i,j}$ of the updated adjacent matrix [A'] is multiple by (Old $I_{ij}$/New $I_{ij}$) to obtain a further updated adjacency matrix [A'']. For obtaining the updated adjacency matrix [A''], the value of Old $I_{ij}$ is the value of the corresponding element $I_{ij}$ of the water-flow vector [I], and the value of New $I_{ij}$ is the value of the corresponding element $I'_{ij}$ of the updated water-flow vector [I']. Again, a further updated water-flow vector [I''] is computed based on the further updated adjacency matrix [A'']. The process of computing a further updated adjacency matrix and then a further updated water-flow vector is repeated iteratively until the two consecutive water-flow vectors converge, i.e., do not change with respect to each other. At the iteration where the water-flow vector is same as the water-flow vector of the previous iteration, the iterations are stopped, and the water-flow vector of the last iteration is considered as the final water-flow vector [$I_F$].

Now, the value of the element in the final water-flow vector [$I_F$] corresponding to the pipe $p_i$ is the fraction of water-flow $I_{pi}(n_{in}, n_t)$ for the inlet node $n_{in}$ and the demand node $n_t$. The fractions of water-flow $I_{pi}$ through the pipe $p_i$ for all the identified pairs of inlet node and demand node are computed in a similar manner.

After determining the fractions of water-flow $I_{pi}$ for all the pairs of inlet node and demand node identified for the pipe $p_i$, the current-flow centrality metric $M_F(p_i)$ is computed based on equation (7) below:

$$M_F(p_i) = \sum_{n_{in},n_t \in V} I_{pi}(n_{in}, n_t), \qquad (7)$$

where the summation is over all the identified pairs of inlet and demand nodes belonging to the V number of nodes. The current-flow centrality metric $M_F$ for all the pipes p are computed in a similar manner.

After this, the pressure head at the demand node $n_1$ due to the water flow from the inlet node $n_{in}$ is determined. Since the inlet node $n_{in}$ functions as a source node in the water distribution network the inlet node is referred to as the source node, denoted by $n_s$. Let the pressure head at the demand node $n_1$ due to the water flow from the source node $n_s$ be denoted by $H(n_1,n_s)$. For computing $H(n_1,n_s)$, the shortest path from the source node $n_s$ to the demand node $n_1$ is identified. The shortest path is denoted as $W_{ns,n1}$. The shortest path $W_{ns,n1}$ is identified as a path from the source node $n_s$ to the demand node $n_1$ for which the sum of the elements of the adjacency matrix [A] governing the path is minimums. The length of the path may be understood as the hydraulic distance between the source node $n_s$ and the demand node $n_1$.

After the shortest path $W_{ns,n1}$ is i identified, the pressure head $H(n_1,n_s)$ is computed based on equation (8) below:

$$H(n_1, n_s) = h_{ns} - \mu \times \sum_{P_j \in W_{ns,n1}} M_F^2(p_j) \times \frac{L_{P_j}}{R_{P_j}^5} - h_{n1}, \qquad (8)$$

where $h_{ns}$ is the pressure head of the source node $n_s$, $M_F(p_j)$ is the current-flow centrality metric for $j^{th}$ pipe $p_j$ in the shortest path $W_{ns,n1}$, $L_{pj}$ is the length of the pipe $p_j$, $R_{pj}$ is the radius of the pipe $p_j$, $h_{n1}$ is the pressure head due to elevation or depression of the demand node $n_1$, and μ is a constant that normalizes the unit of the summation term to the unit of $h_{ns}$. The term $p_j \in W_{ns,n1}$ means all the pipes that are in the shortest path $W_{ns,n1}$. In an implementation, the constant μ of equation (8) is determined by computing the pressure head $H(n_i,n_s)$ for the demand node $n_i$ having the highest elevation in the water distribution network and equating the value of the pressure head $H(n_i,n_s)$ to the minimum pressure that is to be maintained in the water distribution network.

Now, for the determining the leak signature value $Q_{11}$, the element $b(n_1)$ in the proxy water-supply vector [b] is incremented by the predefined flow increment value Δ, and, keeping rest of the quantities same, a first updated pressure head $H^1(n_1,n_s)$ is determined in the first iteration based on the revised proxy water-supply vector [b']. With this, in the first iteration, the value of the element $b'(n_1)$ in the proxy water-supply vector [b'] is $-(Fp_1/m+\Delta)$, which is indicative of an increment in the water-supply at the demand node $n_1$. After this, the process may be repeated to determine a second updated pressure head $H^2(n_1,n_s)$ in the second iteration by incrementing the element $b'(n_1)$ in the proxy water-supply vector [b'] by the predefined flow increment value Δ. With this, in the second iteration, the value of the element $b'(n_1)$ in the proxy water-supply vector [b''] is $-(Fp_1/m+2\Delta)$. The above mentioned process may be repeated in the third iteration, in fourth iteration, and so on, to determine a third updated pressure head $H^3(n_1,n_s)$, a fourth updated pressure head $H^4(n_1,n_s)$, ..., with the corresponding value of the element $b(n_1)$ in the proxy water-supply vector [b] as $-(Fp_1/m+3\Delta)$, $-(Fp_1/m+4\Delta)$, ..., respectively. Thus, in general, in the $k^{th}$ iteration, where k=1, 2, and so on, the pressure head $H^k(n_1,n_s)$ is determined with the corresponding value of the element $b(n_1)$ in the proxy water-supply vector [b] as $-(Fp_1/m+k\Delta)$.

The iteration is stopped when the pressure head for that iteration is within a first predefined tolerance limit of the predefined burst pressure head $h_0$ due to the leak at the demand node $n_1$. In an example, the first predefined tolerance limit may be 5%. If the iteration stops at the $g^{th}$ iteration, then the value of $g\Delta$ is a signature of the leak at the demand node $n_1$ at the time interval $t_1$. This value of $g\Delta$ is thus the leak signature value $Q_{11}$ of the demand node $n_1$ at the time interval $t_1$, and is equal to the total flow increment due to the leak at the demand node $n_1$ at time interval $t_1$.

The above described procedure is repeated to determining the leak signature values $Q_{ij}$'s for all the demand nodes $n_i$'s and at all the time intervals $t_j$'s. For determining the leak signature value $Q_{ij}$, the pressure head $H(n_i,n_s)$ at the demand node $n_i$ and at the time interval $t_j$ due to the water flow from the inlet node $n_{in}$, i.e., the source node $n_s$ is determined based on equation (9) below:

$$H(n_1, n_s) = h_{ns} - \mu \times \sum_{p_j \in W_{ns,ni}} M_F^2(p_j) \times \frac{L_{pj}}{R_{pj}^5} - h_{ni}, \quad (9)$$

where $h_{ns}$ is the pressure head of the source node $n_s$, $M_F(p_j)$ is the current-flow centrality metric for $j^{th}$ pipe $p_j$ in the shortest path $W_{ns,ni}$, $L_{pj}$ is the length of the pipe $p_j$, $R_{pj}$ is the radius of the pipe $p_j$, $h_{ni}$ is the pressure head due to elevation or depression of the demand node $n_i$, and μ is a constant that normalizes the unit of the summation term to the unit of $h_{ns}$. The term $p_j \in W_{ns,ni}$ means all the pipes that are in the shortest path $W_{ns,ni}$. The pressure head $H^k(n_i,n_s)$ is iteratively determined, through equation (9), say till the $k^{th}$ iteration, where k=1, 2, ..., with the corresponding value of the element $b(n_i)$ in the proxy water-supply vector [b] as $-(Fp_j/m+k\Delta)$, such that the pressure head $H^k(n_i,n_s)$ is within the first predefined tolerance limit of the predefined burst pressure head $h_i$ due to the leak at the demand node $n_i$. At this, the value of $k\Delta$ is the leak signature value of the demand node n at the time interval $t_j$. In an example, the predefined burst pressure head $h_i$ may vary depending on the demand node. The predefined burst pressure heads and the predefined first tolerance limit may be defined by the user operating the system 100 and are stored in the leak signature data 122.

FIG. 2 illustrates a method 200 for locating a leak in a water distribution network, according to an implementation of the present subject matter. The order in which the method 200 is described is not intended to be construed as a limitation, and any number of the described method blocks can be combined in any order to implement the method 200, or an alternative method.

Furthermore, the method 200 can be implemented by processor(s) or computing devices in any suitable hardware, non-transitory machine readable instructions, or combination thereof. It may be understood that steps of the method 200 may be executed based on instructions stored in a non-transitory computer readable medium as will be readily understood. The non-transitory computer readable medium may include, for example, digital data storage media, digital memories, magnetic storage media, such as a magnetic disks and magnetic tapes, hard drives, or optically readable digital data storage media.

Further, although the method 200 may be implemented in any computing device; in an example described in FIG. 2, the method 200 is explained in context of the aforementioned system 100, for the ease of explanation.

Referring to FIG. 2, at block 202, a leak situation in the water distribution network is detected based on a flow difference value between an actual flow value and a predicted flow value of an inlet flow meter of the water distribution network at at least one time interval. The leak situation is detected when the flow difference value at least at one time interval is more than a predefined leak threshold. The leak situation in the water distribution network may be detected by the system 100 as described earlier in the description.

At block 204, leak signature values of demand nodes in the water distribution network at the at least one time interval are determined. As described earlier, a leak signature value of a respective demand node at a respective time interval is indicative of a total flow increment due to a leak at the respective demand node and is determined based on centrality metrics, the predicted flow value at the respective time interval, and static physical properties related to the water distribution network. As described earlier, the leak signature value of a demand node is determined by computing the total flow increment for which a pressure head at the demand node due to a water flow from an inlet node is about a predefined burst pressure head due to the leak at the demand node. The leak signature values of the demand nodes and at the time intervals may be determined by the system 100 as described earlier in the description.

After determining the leak signature values of the demand nodes and at the time intervals, at least one possible leak node, from amongst the demand nodes, is identified at block 206. The possible leak nodes are identified based on the comparison and matching of the flow difference value and the leak signature values of the demand nodes at the at least one time interval. Based on the identification of the possible leak nodes, the location of the respective possible leak node can be visited to determine an actual node where the leak has occurred. The possible leak nodes may be identified by the system 100 as described earlier in the description.

Although implementations for the methods and the systems have been described in language specific to structural features, it is to be understood that the invention is not necessarily limited to the specific features described. Rather, the specific features are disclosed as implementations for the methods and the systems to locate a leak in a water distribution network.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having,"

"containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A method for locating a leak in a water distribution network, the method comprising:
    detecting, by a processor, a leak situation in the water distribution network based on a flow difference value between an actual flow value and a predicted flow value of an inlet flow meter of the water distribution network at at least one time interval being more than a predefined leak threshold;
    determining, by the processor, leak signature values of demand nodes in the water distribution network at the at least one time interval, wherein a leak signature value of a respective demand node at a respective time interval is indicative of a total flow increment due to the leak at the respective demand node and is determined based on centrality metrics, the predicted flow value at the respective time interval, and static physical properties related to the water distribution network; and
    identifying, by the processor, at least one possible leak node, from amongst the demand nodes, based on the flow difference value and the leak signature values of the demand nodes at the at least one time interval,
    wherein determining the leak signature value of the respective demand node at the respective time interval comprises:
        generating an adjacency matrix for a network topology of the water distribution network having pipes and nodes, wherein the adjacency matrix is generated based on the static physical properties related to the water distribution network, and
        computing current-flow centrality metrics for pipes in the water distribution network that are in a water path from an inlet node to the respective demand node, wherein a current-flow centrality metric for a respective pipe is indicative of an amount of water passing through the respective pipe in the water path, and wherein the computing the current-flow centrality metrics is based on the adjacency matrix and a water supply at each of the demand nodes equal to the predicted flow value at the respective time interval divided by a number of the demand nodes.

2. The method as claimed in claim 1 further comprising:
    obtaining, by the processor, historic flow values of the inlet flow meter when the water distribution network is leak-free; and
    determining, by the processor the predicted flow value of the inlet flow meter at the at least one time interval based on the historic flow values.

3. The method as claimed in claim 1, wherein the determining the leak signature value of the respective demand node comprises:
    computing the total flow increment for which a pressure head at the respective demand node due to a water flow from an inlet node is about a predefined burst pressure head due to the leak at the respective demand node.

4. The method as claimed in claim 1 further comprises:
    iteratively determining a pressure head at the respective demand node due to a water flow from the inlet node, wherein the determining the pressure head in each iteration is based on the current-flow centrality metrics computed based on incrementing the water supply at the respective demand node by a predefined flow increment value; and
    determining the leak signature value of the respective node equal to an integer multiple of the predefined flow increment value, wherein the integer multiple is based on a number of iterations till the pressure head at the respective node is within a first predefined tolerance limit of a predefined burst pressure head due to the leak at the respective demand node.

5. The method as claimed in claim 1, wherein identifying the at least one possible leak node comprises:
    identifying the respective demand node as one of the at least one possible leak node when the flow difference value at the respective time interval is within a second predefined tolerance limit of the leak signature value of the respective demand node at the respective time interval.

6. The method as claimed in claim 1, wherein
    for a pair of nodes connected directly to each other through a single pipe, an element of the adjacency matrix has a value of diameter of the single pipe raised to power five divided by length of the single pipe; and
    for a pair of nodes not connected directly to each other, an element of the adjacency matrix has a value of zero.

7. A system for locating a leak in a water distribution network, the system comprising:
    a processor; and
    a leak detection module coupled to, and executable by, the processor to:
        obtain an actual flow value and a predicted flow value of an inlet flow meter of the water distribution network at at least one time interval; and
        compute a flow difference value between the actual flow value and the predicted flow value at the at least one time interval to detect a leak situation in the water distribution network based on the flow difference value being more than a predefined leak threshold;
    a leak signature computation module coupled to, and executable by, the processor to determine leak signature values of demand nodes in the water distribution network at the at least one time interval, wherein a leak signature value of a respective demand node at a respective time interval is indicative of a total flow increment due to the leak at the respective demand node and is determined based on centrality metrics, the predicted flow value at the respective time interval, and static physical properties related to the water distribution network; and
    a leak location module coupled to, and executable by, the processor to identify at least one possible leak node, from amongst the demand nodes, based on the flow difference value and the leak signature values of the demand nodes at the at least one time interval,
    wherein, to determine the leak signature value of the respective demand node at the respective time interval, the leak signature computation module
        generates an adjacency matrix for a network topology of the water distribution network having pipes and nodes, wherein the adjacency matrix is generated based on the static physical properties related to the water distribution network, and computes current-flow centrality metrics for pipes in the water distribution network that are in a water path from an inlet node to the respective demand node, wherein a current-flow centrality metric for a respective pipe is indicative of an amount of water passing through the respective pipe in the water path, and wherein the current-flow centrality metrics are based on the adjacency matrix and based on a water supply at each of the demand nodes equal to the predicted flow value at the respective time interval divided by a number of the demand nodes.

8. The system as claimed in claim 7, wherein the leak detection module obtains historic flow values of the inlet flow meter when the water distribution network is leak-free, wherein the predicted flow value of the inlet flow meter at the at least one time interval is obtained based on the historic flow values.

9. The system as claimed in claim 7, wherein the leak signature computation module computes the total flow increment, as the leak signature value of the respective demand node, for which a pressure head at the respective demand node due to a water flow from an inlet node is about a predefined burst pressure head due to the leak at the respective demand node.

10. The system as claimed in claim 7, wherein the leak signature computation module iteratively determines a pressure head at the respective demand node due to a water flow from the inlet node, wherein the pressure head in each iteration is determined based on the current-flow centrality metrics computed based on incrementing the water supply at the respective demand node by a predefined flow increment value; and determines the leak signature value of the respective node equal to an integer multiple of the predefined flow increment value, wherein the integer multiple is based on a number of iterations till the pressure head at the respective node is within a first predefined tolerance limit of a predefined burst pressure head due to the leak at the respective demand node.

11. The system as claimed in claim 7, wherein the leak location module identifies the respective demand node as one of the at least one possible leak node when the flow difference value at the respective time interval is within a second predefined tolerance limit of the leak signature value of the respective demand node at the respective time interval.

12. The system as claimed in claim 7, wherein, in the adjacency matrix, for a pair of nodes connected directly to each other through a single pipe, an element of the adjacency matrix has a value of diameter of the single pipe raised to power five divided by length of the single pipe; and for a pair of nodes not connected directly to each other, an element of the adjacency matrix has a value of zero.

13. A non-transitory computer-readable medium comprising instructions executable by a processor to:

detect a leak situation in the water distribution network based on a flow difference value between an actual flow value and a predicted flow value of an inlet flow meter of the water distribution network at least one time interval being more than a predefined leak threshold;

determine leak signature values of demand nodes in the water distribution network at the at least one time interval, wherein a leak signature value of a respective demand node at a respective time interval is indicative of a total flow increment due to a leak at the respective demand node and is based on centrality metrics, the predicted flow value at the respective time interval, and static physical properties related to the water distribution network; and identify at least one possible leak node, from amongst the demand nodes, based on the flow difference value and the leak signature values of the demand nodes at the at least one time interval, wherein determining the leak signature value of the respective demand node at the respective time interval comprises:

generating an adjacency matrix for a network topology of the water distribution network having pipes and nodes, wherein the adjacency matrix is generated based on the static physical properties related to the water distribution network, and computing current-flow centrality metrics for pipes in the water distribution network that are in a water path from an inlet node to the respective demand node, wherein a current-flow centrality metric for a respective pipe is indicative of an amount of water passing through the respective pipe in the water path, and wherein the computing the current-flow centrality metrics is based on the adjacency matrix and a water supply at each of the demand nodes equal to the predicted flow value at the respective time interval divided by a number of the demand nodes.

* * * * *